United States Patent [19]

Myers

[11] 4,384,899
[45] May 24, 1983

[54] BONDING METHOD ADAPTABLE FOR MANUFACTURING CAPACITIVE PRESSURE SENSING ELEMENTS

[75] Inventor: Donald O. Myers, Carpentersville, Ill.

[73] Assignee: Motorola Inc., Schaumburg, Ill.

[21] Appl. No.: 319,860

[22] Filed: Nov. 9, 1981

[51] Int. Cl.³ .................. H01L 21/02; H01G 7/00; C03B 23/20; C03C 27/00
[52] U.S. Cl. .................................. 148/1.5; 65/40; 65/58; 156/273.1; 29/25.41
[58] Field of Search .................. 29/25.41; 148/1.5; 65/40, 58, 59.1, 59.2, DIG. 4; 156/273.1, 273.9

[56] References Cited

U.S. PATENT DOCUMENTS

| | | | |
|---|---|---|---|
| 3,328,653 | 6/1967 | Wolf, Jr. | 361/283 |
| 3,397,278 | 8/1968 | Pomerantz | 357/40 |
| 3,417,361 | 12/1968 | Heller et al. | 338/42 |
| 3,634,727 | 1/1972 | Polye | 361/434 |
| 3,697,917 | 10/1972 | Orth et al. | 338/2 |
| 3,858,097 | 12/1974 | Polye | 361/283 |
| 3,993,939 | 11/1976 | Slavin | 361/283 |
| 4,025,942 | 5/1977 | Kurtz | 357/26 |
| 4,083,710 | 4/1978 | Hewitt et al. | 65/40 |
| 4,225,632 | 9/1980 | Ho | 427/79 |
| 4,261,086 | 4/1981 | Giachino et al. | 415/151 |
| 4,277,814 | 7/1981 | Giachino et al. | 361/283 |

OTHER PUBLICATIONS

Electro Component Science and Technology, 1975, vol. 2, No. 1, pp. 45-53, Wallis, "Field Assisted Glass Sealing".
Journal of Applied Physics, vol. 40, No. 10, pp. 3946-3949, Sep. 1969, Wallis and Pomerantz, "Field Assisted Glass-Metal Sealing".
IEEE Transactions on Electron Devices, vol. ED-27, No. 5, May 1980, Sander et al, "Monolithic Capacitive Pressure Sensor with Pulse-Period Output".
Electrostatic Bonding Article 19742.

*Primary Examiner*—L. Dewayne Rutledge
*Assistant Examiner*—Alan E. Schiavelli
*Attorney, Agent, or Firm*—Phillip H. Melamed; James S. Pristelski; James W. Gillman

[57] ABSTRACT

A method of utilizing anodic bonding to bond a conductive semiconductor wafer to a metallized dielectric glass plate so as to form a capacitive pressure sensing element is disclosed. The method includes positioning the semiconductor wafer in contact with the glass plate, heating the wafer and glass plate and applying a substantial positive DC potential to the semiconductor wafer and metallization on the glass plate while applying a negative DC voltage potential to the glass plate. The glass plate metallization forms one capacitor plate of the capacitive pressure sensing element while the semiconductor wafer forms the other capacitor plate. By applying the same voltage potential to the glass plate metallization and the semiconductor wafer during anodic bonding of the wafer to the glass plate, the corona field between the glass plate metallization and the semiconductor wafer is reduced thereby improving the bond between the wafer and the glass plate and reducing the possibility of arcing between the semiconductor wafer and the glass plate metallization. Also sodium ion migration to the glass plate metallization and any metallization connected to this metallization is inhibited wherein the ion migration would impair the subsequent solderability of these metallizations.

34 Claims, 5 Drawing Figures

BONDING METHOD ADAPTABLE FOR MANUFACTURING CAPACITIVE PRESSURE SENSING ELEMENTS

BACKGROUND OF THE INVENTION

The present invention generally relates to the field of bonding conductive and nonconductive bodies together by means of anodic bonding techniques. The present invention more specifically relates to the field of utilizing anodic bonding techniques for manufacturing capacitive pressure sensing elements in which pressure changes alter the spacing between capacitive plates thereby providing changes in capacitance related to sensed pressures.

Capacitive pressure sensing elements are known in which pressure changes result in altering the spacing between capacitor plates so as to provide a change in electrical characteristics indicative of sensed pressure. One such capacitive pressure sensing element is illustrated in U.S. Pat. No. 4,225,632 to Ho which is assigned to the same assignee as the present invention. In such capacitive pressure sensing elements, typically one capacitor plate is mounted on a relatively rigid base substrate while another capacitor plate is spaced apart from the base substrate capacitor plate and is mounted on a flexible diaphragm. In response to pressure changes, the diaphragm will flex thereby changing the spacing between the capacitor plates and providing a change in capacitance representative of the sensed pressure.

Capacitive pressure sensing elements such as those described in the above referred to U.S. Patent provide an internal cavity for storing a fixed or variable predetermined reference pressure within the sensing element such that pressures external to the sensing element diaphragm are measured with respect to this reference pressure. Typically some sort of bonding material is utilized to mount the diaphragm to the base substrate. The use of this bonding material affects the nominal separation between the diaphragm and base substrate capacitor plates and therefore controlling the thickness of this bonding material is critical to insure proper production of the capacitive sensing element. Also the bonding material is used to form part of a hermetic seal for the internal cavity. Such pressure sensing elements are used for sensing automobile engine manifold pressure so as to provide a pressure related capacitance which will be used to electrically control the automobile engine.

Some capacitive sensing elements have eliminated the need for a separate bonding material to bond the diaphragm to the base substrate, thus eliminating the need for controlling the bonding material thickness and for insuring hermeticity of the bonding material itself. This has been accomplished through the use of anodic bonding techniques which bond a thin wafer of conductive semiconductor material, which acts as the pressure sensing diaphragm and one of the capacitor plates, to a relatively thick dielectric glass plate base substrate having a metallization on an exterior surface thereof which functions as the other capacitor plate.

Typically, each individual capacitive sensing element comprises a portion of a semiconductor wafer having a central surface recessed portion and a surrounding non-recessed portion, and this element functions as the pressure sensing diaphragm. The base substrate of the capacitive pressure sensing element comprises a portion of a glass plate having a conductive metallization centrally positioned on an exterior surface thereof. The diaphragm and base substrate are bonded to each other by anodic bonding techniques such that the recessed portion of the conductive pressure sensing diaphragm is spaced apart and insulated from, but facing, the base substrate metallization with the nonrecessed surrounding portion of the diaphragm being bonded to the base substrate surface on which the base substrate metallization is located. This structure forms a capacitive pressure sensing element having an internal cavity which separates the two electrodes of the pressure sensing capacitor, one of which comprises the base substrate metallization and the other of which comprises the conductive pressure sensing diaphragm. Typically conductive feedthroughs in the base substrate have been utilized to make electrical output connections to the base substrate electrode metallization and the conductive diaphragm.

It is known to anodically bond the conductive semiconductor diaphragm to the glass plate base substrate to manufacture capacitive pressure sensing elements as described above. The present invention involves an improved bonding method for manufacturing such sensing elements. In the known anodic bonding method utilized for construction of these capacitive pressure sensing elements, a negative voltage potential is applied to the glass dielectric plate while a substantial positive voltage potential is applied to the conductive semiconductor diaphragm after the diaphragm and dielectric plate have been placed in contact with each other and properly aligned and after both components have been heated to a substantial temperature. This corresponds to the standard technique of utilizing anodic bonding to provide a bond between conductive and dielectric materials. The use of anodic bonding techniques has therefore eliminated the need for a separate bonding material between the diaphragm and base substrate and has therefore improved the repeatability of manufacturing capacitive sensing elements by providing a substantially constant and predictable value for the nominal capacitance of the pressure sensing element.

While the use of the above-described anodic bonding technique to manufacture capacitive pressure sensing elements is feasible, I have noticed that the use of this prior technique can cause several potential problems. One of these problems is that because of the close spacing typically provided between the base substrate electrode metallization and the conductive diaphragm, a substantial corona field exists between these two elements during the application of voltage potentials during the anodic bonding process. This results in having less energy available to actually form the anodic bond since a substantial amount of energy goes into providing the corona field between the base metallization and the conductive diaphragm. In addition, I noticed that during the anodic bonding process severe arcing can occur in the area between the base electrode metallization and the conductive diaphragm which can result in the vaporization of the base substrate electrode metallization thereby degrading the integrity of this metallization. I also noticed that during the anodic bonding process a substantial bowing of the diaphragm towards the base electrode metallization is likely, and that if the diaphragm touches the electrode metallization this will result in the formation of an undesired silicon gold eutectic. Also, I noticed that when the anodic bonding technique, as described above, was utilized significant solderability problems occurred after the anodic bonding with respect to gold metallizations that were connected to the base substrate electrode and formed the connection points for solder connecting the capacitive pressure sensing element to other electronic components.

SUMMARY OF THE INVENTION

An object of the present invention is provide an improved anodic bonding method which is adaptable for use in manufacturing capacitive pressure sensing elements and which overcomes the above described disadvantages of prior anodic bonding methods.

A more particular object of the present invention is to provide an improved anodic bonding method, adaptable for use in manufacturing capacitive pressure sensing elements, wherein conductive and nonconductive bodies are bonded together with an improved bond while the solderability and integrity of metallization on the nonconductive body is maintained.

In one embodiment of the present invention, a method for bonding conductive and nonconductive bodies together is provided and includes the steps of: providing a first body of conductive material having a first exterior surface; providing a second body of dielectric material having a second exterior surface with at least one area of said second surface having at least one electrically conductive metallization thereon; providing at least one of said first and second surfaces with a surface recessed portion substantially surrounded by a nonrecessed surface portion; bonding said dielectric material second surface to said conductive material first surface with said nonrecessed portion of said one of said surfaces in contact with and bonded to the other of said surfaces and said metallization on said second surface being substantially surrounded by said nonrecessed surface portion, said recessed portion and said other of said surfaces forming an internal cavity therebetween with said metallization at least partially located therein; wherein said bonding step is performed by anodic bonding wherein a first voltage potential is applied to said first conductive body while a substantially different second voltage potential is applied to said second dielectric body, and wherein a voltage potential substantially similar to said first voltage potential is applied to said metallization during the application of said first and second voltage potentials whereby corona and arcing effects are prevented from occurring in said recessed portion during said bonding step.

According to another aspect of the present invention a method of bonding conductive and nonconductive bodies together is provided which includes the steps of: providing a first body of conductive material having a first exterior surface; providing a second body of dielectric material having a second exterior surface, said second body also having at least one electrically conductive metallization thereon to which solder will subsequently be applied to; bonding said dielectric material second surface to said conductive material first surface; applying, subsequent to said bonding step, solder to said metallization; and providing electrical isolation between said metallization and said first body after said bonding step; wherein said bonding step is performed by anodic bonding wherein a first voltage potential is applied to said first conductive body while a substantially different second voltage potential is applied to said second dielectric body, and wherein a voltage potential substantially similar to said first voltage potential is applied to said metallization during the application of said first and second voltage potentials whereby the solderability of the isolated conductive metallization is maintained.

The present invention contemplates the utilization of both of the above recited aspects of the invention with respect to manufacturing capacitive pressure sensing elements. Essentially, the present invention provides for applying the same voltage potential to the dielectric material metallization as is applied to the conductive material during the anodic bonding process. This results in reducing the corona field in any separation (gap) provided between the dielectric material metallization and the conductive first body. In addition, by applying the same positive voltage potential to the first conductive body and the dielectric material metallization, migration of sodium ions to the metallization is reduced and this maintains the solderability characteristics of the metallization. Holding the metallization at the same potential as the first conductive body also eliminates any bowing of the pressure sensing diaphragm, which preferably comprises the first body, and substantially eliminates the possibility of having the first conductive body contact the dielectric material metallization during the anodic bonding process which can result in the production of an undesired silcon gold eutectic which thereby degrades, the integrity of the dielectric material metallization. Also the possibility of arcing causing vaporization and therefore degradation of the integrity of the base substrate metallization is reduced. All of these beneficial advantages are accomplished by the utilization of the improved anodic bonding methods discussed above. Additional features of the improved methods of the present invention are discussed subsequently in connection with the description of the preferred embodiments of the present invention.

BRIEF DESCRIPTION OF THE DRAWINGS

For a more complete understanding of the invention reference should be made to the drawings, in which.

DESCRIPTION OF THE PREFERRED EMBODIMENT

Figure 1:
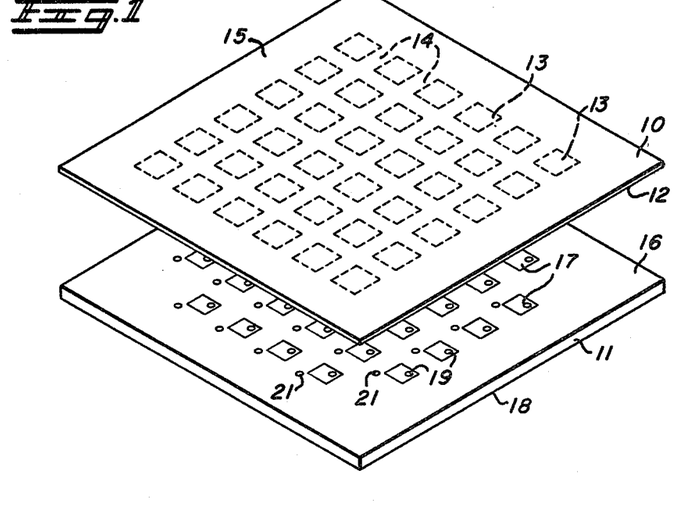
FIG. 1 is a perspective view of a wafer of conductive semiconductor material and a glass plate of dielectric material having metallizations thereon prior to the bonding of these two elements.

FIG. 1 illustrates a conductive semiconductor (silicon) wafer 10 and a metallized dielectric glass plate 11 immediately prior to the assembly and bonding of these two elements so as to form a plurality of individual variable capacitance pressure sensing elements which will subsequently be separated by dicing the assembled wafer and plate. The semiconductor wafer 10 comprises a relatively thin planar wafer of conductive semiconductor material which has been preferably heavily doped with N-type phosphorous dopant. The effect of the doping of the semiconductor wafer 10 is that this wafer is now substantially conductive as opposed to pure (intrinsic) semiconductor material. The wafer 10 essentially correponds to a first body of conductive material and has a first planar exterior surface 12 having a plurality of etched surface recessed portions 13 thereon each of which are entirely surrounded by associated nonrecessed portions 14 of the surface 12. The surface 12 comprises the bottom side of the wafer 10 as shown in FIG. 1. The nonrecessed surface portions 14 together substantially form a plane which is parallel to a top planar surface 15 of the semiconductor wafer 10. The recessed portions 13 comprise etched rectangular cavities each having a major surface recessed portion 13A parallel to the planar surface 15.

It should be noted that the major recessed portions 13A of the semiconductor wafer 10, subsequent to dicing of the wafer after it has been bonded to the dielectric plate 11, will form conductive pressure sensing diaphragms with each major surface recessed portion 13A essentially forming a movable electrode diaphragm of a variable capacitance capacitor.

The glass dielectric plate 11 is preferably formed from Pyrex ® 7740 glass material, and the plate 11 is substantially thicker than the wafer 10. The glass plate 11 corresponds to a second body of dielectric material and has a second exterior surface (top as viewed in FIG. 1) 16 which is essentially planar. A plurality of isolated conductive metallizations 17 are provided on the surface 16 of the glass plate 11 and each of these metallizations 17 will eventually form one stationary electrode of an individual capacitive pressure sensing element. The glass plate 11 has an additional planar exterior surface 18, best shown in FIG. 2, which is parallel to surface 16 with the glass plate 11 being between the surfaces 16 and 18. A single through hole 19 is provided in each of the metallizations 17 and each of these through holes is metallized therein to provide a conductive through hole path 19A between the surfaces 16 and 18. Each of the conductive through hole paths 19A electrically connects one of the metallizations 17 on the surface 16 to an associated metallization 20 on the surface 18. In addition, a plurality of similar through holes 21 are provided on the plate 11 and are metallized therein to provide conductive electrical through hole paths 21A from the surface 16 to associated metallizations 22 provided on the surface 18. It should be noted that each of the conductive through hole paths 21A is located separated from but adjacent to an associated one of the capacitor electrode metallizations 17.

In addition to the metallizations 20 and 22, a grid metallization 23 is provided on the surface 18 of the dielectric plate 11. This grid metallization has a large corner probe area 4 to which individual grid metallization fingers 25 are electrically connected. The grid metallization fingers 25 are aligned on the surface 18 such that they traverse across the electrode metallizations 17 but are located on surface 18, rather than surface 16, and are substantially electrically isolated from the metallizations 17 and the metallizations 20 and 22 on the surface 18. It should be noted that all of the metallizations 17, 20, 22, and 23, as well as the electrically conductive paths in the through holes 19 and 21 are preferably solderable gold metallizations which are provided on the glass plate 11 by utilizing thin film sputtering and etching techniques which are well known.

Figure 3:
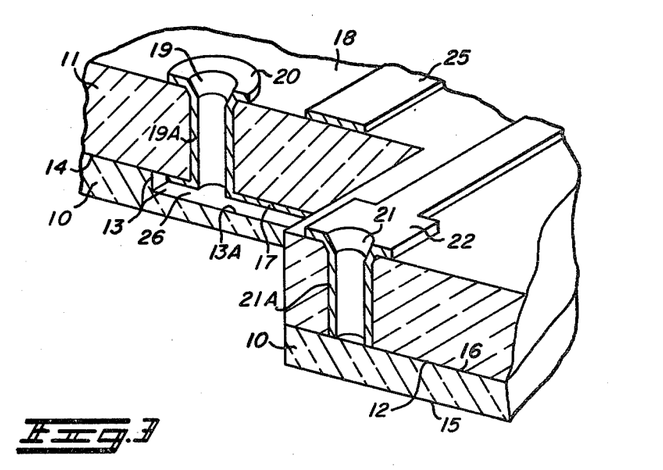
FIG. 3 is an enlarged cross sectional view of the assembled wafer and plate in FIG. 2 taken along lines 3—3.

The semiconductor wafer 10 and the dielectric plate 11 are positioned together immediately prior to the anodic bonding technique of the present invention such that the nonrecessed areas 14 of the surface 12 are in contact with the surface 16 with the major portions 13A of each recessed portion 13 being positioned facing and in spaced, adjacent substantially parallel alignment with an associated one of the electrically conductive metallizations 17 on the dielectric material surface 16. It should be noted that preferably the nonrecessed portions 14 will entirely laterally surround each of the metallizations 17 which are spaced apart from and insulated from the conductive semiconductor wafer 10. This alignment will result in forming a plurality of individual capacitors with each capacitor comprising one of the metallizations 17 as one capacitor electrode and the major portion 13A of an associated one of the recessed portions 13 forming another capacitor electrode thereof. The above-described configuration also results in having the semiconductor wafer 10 and the glass plate 11 form a plurality of internal cavities 26 with the surface recessed portion 13 and the surface 16 and metallizations 17 substantially forming hermetic boundaries thereof. One of these internal cavities 26 is illustrated in FIG. 3 of the drawings. Each metallization 17 is at least partially located within the cavity 26, and as shown in the drawings the metallization 17 is preferably located totally within each cavity 26. Typically the cavity 25 will be sealed and store a predetermined reference pressure therein. An opening into the cavity 26 may be provided for applying this reference pressure, and it is contemplated that this opening, which may correspond to through hole 19, will subsequently be hermetically sealed.

According to the present invention, the semiconductor wafer 10 and glass plate 11 are assembled as described above and as shown in FIGS. 2 and 3. Subsequently, the bodies 10 and 11, as assembled, are mounted on an electrically conductive heating and anodic bonding plate 27 shown in FIG. 2 with the conductive semiconductor wafer surface 15 in surface contact with the plate 27. The plate 27 is utilized for heating the assembled wafer 10 and glass plate 11 to a substantial elevated temperature of at least 350 degrees centigrade. Preferably an elevated temperature of 400 degrees centigrade is utilized. The term "elevated temperature", as used herein, refers to a temperature substantially above a normal ambient room temperature such as 23 degrees centigrade.

Figure 2:
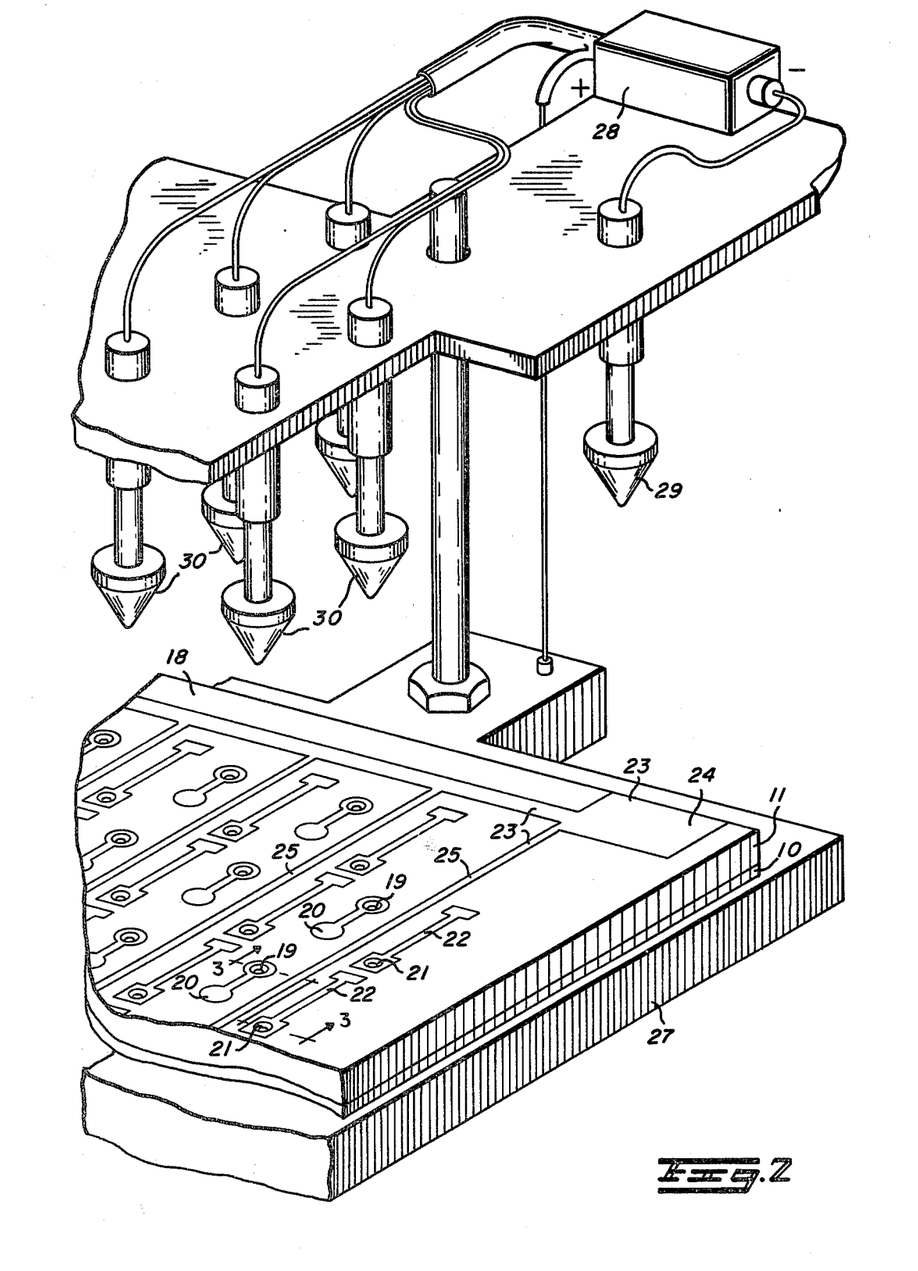
FIG. 2 is a perspective view of the wafer and glass plate in FIG. 1 assembled together, inverted with respect to the orientation shown in FIG. 1, and mounted in an anodic bonding fixture.

While the wafer 10 and glass plate 11 are substantially maintained at at least this elevated temperature a first positive DC voltage potential is applied to the first conductive body, comprising the conductive semiconductor wafer 10, while a substantially different second negative DC voltage potential is applied to the second dielectric body comprising the glass plate 11. Preferably, a voltage source 28 is utilized to provide these voltage potentials by applying a positive voltage potential to the plate 27, which thereby applies this potential to the conductive semiconductor wafer 10, and by applying a relatively negative voltage potential to the glass plate 11 by means of a spring loaded probe 29 which is used to contact the area 24 of the grid metallization 23. The difference between the positive and negative voltage potentials applied to the semiconductor wafer 10 and glass dielectric plate 11, respectively, is at least 500 volts, and preferably is 800 volts. While the minimum voltage potential of at least 500 volts and the minimum elevated temperature of at least 350 degrees centigrade will result in providing satisfactory anodic bonds between the surfaces 12 and 16, thereby bonding the conductive wafer 10 to the dielectric plate 11, the preferable voltage difference of 800 volts and temperature of 400 degrees centigrade should be utilized and these conditions should be maintained for ten minutes.

The existence of the above noted conditions will result in forming an anodic bond between the nonrecessed portions 14 of the surface 12 and the portions of surface 16 of the dielectric glass plate 11 which surround the metallizations 17. This is in accordance with known technology wherein anodic bonds between a subassembly of conductors and nonconductors are formed by heating the subassembly and then applying a substantial DC voltage potential thereacross.

The crux of the present invention resides in utilizing a plurality of spring loaded probes 30 to contact each of the metallized through holes 19 and conductive through hole paths 19A so as to thereby apply a voltage potential substantially similar to the positive voltage potential applied to the conductive wafer 10 to each of the dielectric metallizations 17. This is accomplished according to the present invention by connecting each of the spring loaded probes 30 to the same identical positive potential which is applied to the bonding plate 27 which applies this positive potential to the semiconductor wafer 10. This technique has been found to substantially increase the yield of capacitive pressure sensing elements produced by the above-described process while also maintaining the solderability of the metallizations 20 located on the surface 18 which provide a solderable output electrical metallization connection for the capacitor electrode metallizations 17. Both of these results are directly attributable to providing a positive potential to the metallizations 17 during the anodic bonding process rather than letting the metallizations 20 and 17 remain essentially electrically isolated and at a floating potential during anodic bonding. It is contemplated that the probes 29 and 30 are mounted in a vertically movable probe fixture shown in FIG. 2.

Figure 4:
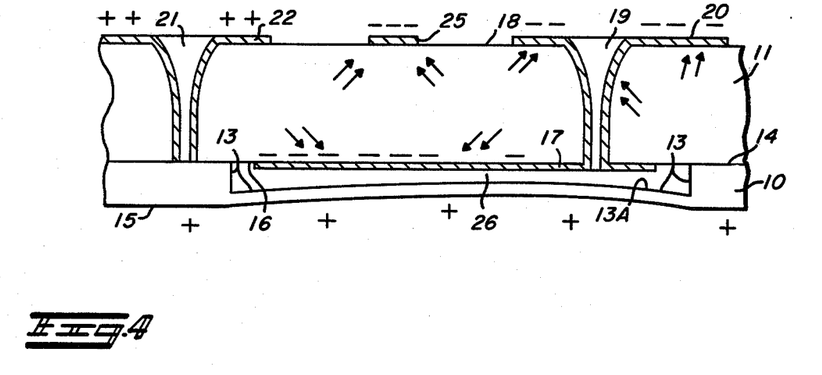
FIG. 4 is a schematic cross sectional diagram of the assembled wafer and dielectric plate shown in FIG. 2 during the use of a prior anodic bonding technique.

FIG. 4 illustrates schematically what happens to a single capacitive sensing element if it is manufactured according to a prior method wherein a positive voltage potential is not applied to each of the conductive through hole paths 19A during the anodic bonding process. In such a case, the substantial potential applied between the dielectric plate 11 and semiconductor wafer 10 will result in producing a bowing of the major recessed surface portion 13A of the semiconductor wafer which is intended to subsequently function as a flexible pressure sensing diaphragm and capacitor electrode. This is due to the electrostatic attraction force between the conductive wafer 10 and the metallization 17 since this metallization will become negatively charged due to the influence of the negative voltage potential applied to the grid metallization fingers 25. The result of this is the narrowing of the spacing (gap) between the major recessed portion 13A and the dielectric metallization 17. This in turn results in increasing the corona field between the metallization 17 and the semiconductor wafer 10. The increased corona field utilizes a substantial amount of energy and therefore detracts from the amount of energy which is available for anodically bonding the dielectric surface 16 to the nonrecessed surface portions 14 of the semiconductor wafer. Thus poorer anodic bonds are formed since less energy from the voltage source 28 is available for creating the anodic bonding between the semiconductor wafer 10 and the dielectric plate 11.

In addition, during the prior bonding method the bowing of the major recessed portion 13A may be such that the recessed portion 13A may actually come in contact with the metallization 17. This will result in the production of an undesired silicon gold eutectic due to the elevated temperature of the semiconductor wafer and dielectric plate. This impairs the integrity of the metallization 17 which is intended to have a thin film gold metallization rather than a silicon gold eutectic. In addition, providing a narrow gap between the major recessed portion 13A and metallization 17 during the anodic bonding process can cause arcing to occur between these elements which will result in the vaporization of the metallization 17. If bowing occurs, the probability of arcing and vaporization increases. This vaporization also impairs the integrity of the metallization 17, and the vaporization can result in the vaporized metallization redepositing within the cavity 26 to form a direct short between the remaining unvaporized metallization 17 and the semiconductor wafer 10 thus destroying the electrical separation of the capacitor electrodes which is necessary for the desired resultant capacitive pressure sensing element.

Another deficiency of the prior method schematically shown in FIG. 4 is that since the conductive through hole path 19A and the metallizations 17 and 20 are not maintained at a positive potential, positive sodium ions in the glass plate 11 will be attracted to the metallizations 17, 19A and 20 during anodic bonding. The presence of these sodium ions in the metallizations 17, 19A and 20 embrittles these metallizations and also impairs their solderability. The solderability aspect is especially significant with respect to the metallization 20 since it is contemplated that subsequent to the anodic bonding process solder will be applied to this metallization so as to provide a solderable electrical connection between the metallization 17 and a ceramic circuit board to which the capacitive pressure sensing element will be mounted. Also solder will be applied to the metallization 20 for bridging the opening 19 to preferably provide a hermetic seal for the cavity 26.

Figure 5:
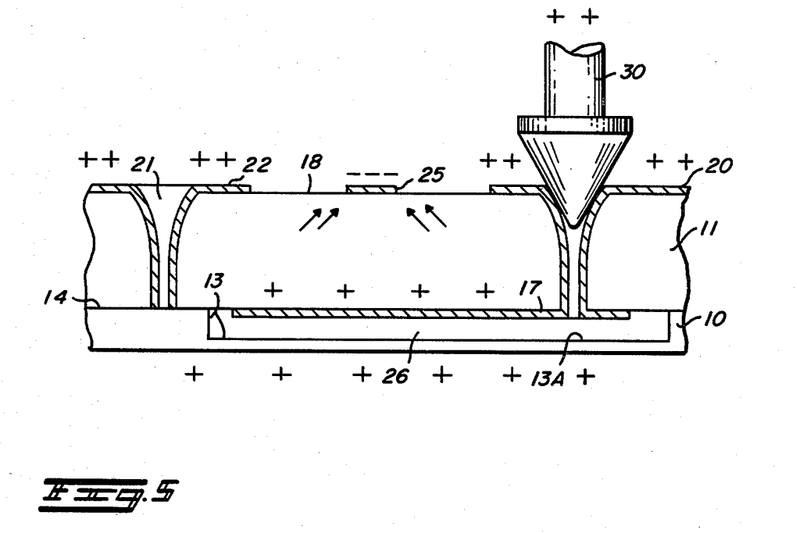
FIG. 5 is a schematic cross sectional view illustrating the assembled wafer and dielectric plate shown in FIG. 2 during the use of the anodic bonding technique of the present invention.

It is contemplated that after anodic bonding, the bonded dielectric plate 11 and semiconductor wafer 10 will be diced so as to form a number of individual capacitive pressure sensing elements such as shown in FIGS. 3, 4 and 5. Preferably this can be accomplished by sawing the bonded wafer and glass plate. After the anodic bonding it is also contemplated that solder will be applied to the metallizations 20 and 22 so as to enable solder attachment and electrical connection of each pressure sensing element, and the electrodes thereof, to conductor metallizations on a ceramic thick film circuit board (not shown). Solder was not applied to the metallizations 20 and 22 prior to the anodic bonding process because of the substantial elevated temperatures required for anodic bonding such that if solder were applied prior to the anodic bonding the continued application of the substantial elevated temperature to the soldered metallization would impair the integrity of the solder bond and metallization.

According to the teachings of the present invention a positive voltage potential identical to the voltage potential applied to the semiconductor wafer 10 is applied to each of the metallizations 17 during the anodic bonding process. This results in eliminating any bowing of the major recessed portions 13A of the wafer towards the metallizations 17 since the electrostatic attraction forces between these elements have been substantially eliminated. The elimination of this bowing effect has substantially eliminated the possibility of the major recessed portions 13A contacting the metallizations 17 and thereby forming an undesired silicon gold eutectic during the anodic bonding process. In addition, by maintaining the major recessed portions 13A and metallizations 17 at substantially the same potential during bonding, the corona field between these elements has been substantially eliminated thereby allowing substantially more usable energy to be directed to forming the anodic bond between the surface 16 of the dielectric plate 11 and the nonrecessed surface areas 14 of the semiconductor wafer 10. Also, the probability of the occurrence of arcing and vaporization is less. Besides all of these benefits, the application of a positive potential to the conductive through hole path 19A during the anodic bonding process has minimized sodium migration effects since now sodium ions will substantially only be attracted to the negative grid metallization fingers 25 which are not intended for subsequent solder application. Thus the solderability of the metallization 20 on the dielectric surface 18 has been maintained.

It should be noted that during the anodic bonding process it is not necessary to provide a separate positive potential probe for contacting the conductive through hole path 21 and its associated conductive metallization 22 since these electrically conductive metallizations will be directly connected to the semiconductor wafer 10, and thereby receive a positive voltage potential, as a result of bonding the glass plate 11 to the nonrecessed surface areas 14 of the semiconductor wafer 10. Thus metallizations 22 will not have their solderability adversely affected by sodium migration during anodic bonding by either the present or prior bonding method.

FIG. 5 illustrates schematically the present invention method and how the application of a positive potential to the conductive metallizations 19A reduces the sodium ion migration effects and the bowing of the major recessed portions 13A of the semiconductor wafer 10, as contrasted with the nonapplication of a positive potential which results in the effects shown in FIG. 4. In FIGS. 4 and 5 sodium ion migration is generally indicated by the presence of arrows directed towards the metallizations which have negative potentials thereon.

It is significant to note that the conductive through hole paths 19 and 21 provide electrical connections on the surface 18 which connect, respectively, to the capacitor electrode metallizations 17 and the conductive semiconductor wafer 10 which includes the major recessed portions 13A that form pressure sensing diaphragm electrodes for the pressure sensing elements. It is significant to note that with the application of a positive potential to the metallizations 17 during the anodic bonding process, a yield for the resultant capacitive pressure sensing elements of more than ten times the previous yield has been obtained.

While I have shown and described specific embodiments of this invention, further modifications and improvements will occur to those skilled in the art. One such modification would be electrically interconnecting all of the metallizations 20 by providing additional metallization on the surface 18, and applying the positive potential to the metallizations 20 by merely utilizing one probe to contact all of these electrically interconnected metallizations. Of course these electrically interconnected metallizations 20 would still be isolated from the negative grid metallization 23. Other possible modifications could include providing the dielectric plate 11 with recessed portions rather than the semiconductor wafer 10, with the metallization 17 being located in the recessed glass plate portions. Also, while providing for entirely surrounding the recessed portions with nonrecessed portions so as to provide a hermetic seal for the cavity 26 is preferred, in some situations, this seal may not be needed so that the nonrecessed portions need only substantially surround the recessed portions. In addition, the present invention would appear applicable for maintaining the solderability of any metallization on the plate 11 which will not always be electrically connected to the conductive wafer 10 after anodic bonding. Thus the present invention also contemplates having solder applied to a metallization which was initially electrically connected to the conductive wafer, but was electrically isolated from the wafer subsequent to anodic bonding. This is in contrast to the preferred embodiment wherein the metallizations 19A and 20 are electrically isolated from the wafer prior to and after anodic bonding. Thus it is contemplated that the metallizations 17 need not be physically spaced apart from the conductive body 10 as long as eventually electrical isolation is provided between each metallization 17 and its associated major recessed portion 13A which form the electrodes of the capacitive pressure sensing element. Also, a slight difference between the potentials applied to the metallizations 17 and the wafer 10 during bonding would also produce satisfactory results. All modifications of the present invention, including all of the above noted modifications, which retain the basic underlying principles disclosed and claimed herein are within the scope of this invention.

I claim:

1. A method for bonding conductive and nonconductive bodies together including the steps of:
   providing a first body of conductive material having a first exterior surface;
   providing a second body of dielectric material having a second exterior surface with at least one area of said second surface having at least one electrically conductive metallization thereon;
   providing at least one of said first and second surfaces with a surface recessed portion substantially surrounded by a nonrecessed surface portion;
   bonding said dielectric material second surface to said conductive material first surface with said nonrecessed portion of said one of said surfaces in contact with and bonded to the other of said surfaces and said metallization on said second surface being substantially surrounded by said nonrecessed surface portion; said recessed portion and said other of said surfaces forming an internal cavity therebetween with said metallization at least partially located therein;
   wherein said bonding step is performed by anodic bonding wherein a first voltage potential is applied to said first conductive body while a substantially different second voltage potential is applied to said second dielectric body, and wherein a voltage potential substantially similar to said first voltage potential is applied to said metallization during the application of said first and second voltage potentials whereby corona and arcing effects are prevented from occurring in said recessed portion during said bonding step.

2. A method for bonding conductive and nonconductive bodies together including the steps of:
providing a first body of conductive material having a first exterior surface;
providing a second body of dielectric material having a second exterior surface, said second body also having at least one electrically conductive metallization thereon to which solder will subsequently be applied to;
bonding said dielectric material second surface to said conductive material first surface;
applying, subsequent to said bonding step, solder to said metallization; and
providing electrical isolation between said metallization and said first body after said bonding step; and
wherein said bonding step is performed by anodic bonding wherein a first voltage potential is applied to said first conductive body while a substantially different second voltage potential is applied to said second dielectric body, and wherein a voltage potential substantially similar to said first voltage potential is applied to said metallization during the application of said first and second voltage potentials whereby the solderability of the isolated conductive metallization is maintained.

3. A method according to claim 2 wherein said first voltage potential and said metallization voltage potential have positive polarities with respect to said second voltage potential.

4. A method according to any of claims 1, 2 or 3 which includes the step of heating said first and second bodies to at least an elevated temperature, such that said first and second bodies are at said elevated temperature during said bonding step.

5. A method for bonding conductive and nonconductive bodies together including the steps of:
providing a first body of conductive material having a first exterior surface;
providing a second body of dielectric material having a second exterior surface with at least one area of said second surface having at least one electrically conductive metallization thereon;
providing at least one of said first and second surfaces with a surface recessed portion substantially surrounded by a nonrecessed surface portion;
bonding said dielectric material second surface to said conductive material first surface with said nonrecessed portion of said one of said surfaces in contact with and bonded to the other of said surfaces and said metallization on said second surface being substantially surrounded by said nonrecessed surface portion and spaced apart from and isolated from said first conductive body, said metallization and said first conductive body effectively forming a capacitor with said metallization forming one capacitor electrode and said first conductive body forming another capacitor electrode, said recessed portion and said other of said surfaces forming an internal cavity therebetween with said metallization at least partially located therein;
wherein said bonding step is performed by anodic bonding wherein a first voltage potential is applied to said first conductive body while a substantially different second voltage potential is applied to said second dielectric body, and wherein a voltage potential substantially similar to said first voltage potential is applied to said metallization during the application of said first and second voltage potentials.

6. A method according to claim 5 wherein said nonrecessed portion entirely laterally surrounds said metallization, said nonrecessed portion and said other of said surfaces, after said bonding step, forming said internal cavity which is also bonded by said surface recessed portion.

7. A method according to claim 5 wherein said recessed and nonrecessed portions are provided on said first conductive body.

8. A method according to claim 7 wherein said first body is provided with a plurality of said recessed and nonrecessed portions, each of said recessed portions provided with associated, surrounding nonrecessed portions, and said second body is provided with a plurality of said metallizations, each metallization associated with one of said recessed portions and surrounded by the associated nonrecessed portion.

9. A method according to claim 8 wherein said first body is provided by utilization of semiconductor material as said conductive material.

10. A method according to claim 9 which includes the step of heavily doping said semiconductor material to enhance its conductivity prior to said bonding step.

11. A method according to claim 10 wherein said second body is provided by utilization of glass as said dielectric material.

12. A method according to any of claims 5, 6, 7, 8, 9, 10 or 11 which includes the step of heating the first and second bodies to at least an elevated temperature and maintaining said first and second bodies at said elevated temperature during the application of said voltage potentials to said first and second bodies and said metallization.

13. A method according to claim 12 wherein said second body of dielectric material is provided with at least one conductive through hole path therein electrically connected to said metallization.

14. A method according to claim 13 wherein said second body is provided with at least one additional conductive through hole path therein which electrically connects to said first conductive body after the bonding of said first and second bodies.

15. A method according to claim 14 wherein said second body is provided with an additional exterior surface, said second body being between said second surface and said additional surface, said conductive through hole paths terminating on said additional surface.

16. A method according to claim 15 which includes the step of providing a grid metallization on said additional surface and the step of applying said second voltage potential to said second body by applying it to said additional surface grid metallization of said second body, said grid metallization being substantially electrically isolated from said conductive through hole path which is electrically connected to said first body.

17. A method according to claim 16 wherein said first body is provided by the utilization of a wafer of semiconductor material as said first body and said second body is provided by the utilization of a plate of glass as said second body.

18. A method according to claim 5 wherein said metallization voltage potential is substantially identical to said first voltage potential.

19. A method according to claim 12 wherein said metallization voltage potential is substantially identical to said first voltage potential.

20. A method for manufacturing variable capacitance pressure sensing elements including the steps of:
providing a first body of conductive material having a first exterior surface with at least one recessed portion thereon entirely surrounded by a nonrecessed surface portion:
providing a second body of dielectric material having a second exterior surface with at least one area of said second surface having at least one electrically conductive metallization thereon;
bonding said dielectric material second surface to said conductive material first surface nonrecessed portion with a major portion of said recessed portion being positioned facing and in spaced, adjacent, substantially parallel alignment with said electrically conductive metallization on said dielectric material second surface and said nonrecessed portion entirely laterally surrounding said metallization which is spaced apart from and insulated from said first conductive body, thereby forming a capacitor with said metallization forming one capacitor electrode and said major portion of said recessed portion of said first body forming another capacitor electrode thereof, and said first and second bodies forming an internal cavity having said surface recessed portion forming a boundary thereof, the capacitance of said capacitor being variable as a function of pressure changes of one or more pressures acting on the electrodes of the capacitor to change the separation therebetween;
wherein said bonding step is performed by anodic bonding wherein a first voltage potential is applied to said first conductive body while a substantially different second voltage potential is applied to said second dielectric body, and wherein a voltage potential substantially similar to said first voltage potential is applied to said metallization during the application of said first and second voltage potentials.

21. A method according to claim 20 wherein said step of providing said first body comprises providing a flat plate as said first body with said first surface of said first body being substantially planar except for said recessed portion.

22. A method according to claim 21 wherein said step of providing said first body comprises utilizing semiconductor material as said first body.

23. A method according to claim 22 which includes the step of heavily doping said semiconductor material with additional material to enhance its conductivity.

24. A method according to claim 23 wherein said step of providing said second body comprises utilizing glass as said dielectric material.

25. A method according to claim 24 wherein the difference between said said first and second voltage potentials has a magnitude of at least 500 volts.

26. A method according to any of claims 20 or 21 wherein said step of providing said second body comprises providing a substantially flat plate portion of dielectric material as said second body.

27. A method according to any of claims 20 or 24 wherein said first voltage potential is positive with respect to said second voltage potential.

28. A method according to claim 20 wherein said metallization voltage potential is substantially identical to said first voltage potential.

29. A method according to any of claims 20, 24, 25 or 28 which includes the step of heating said first and second bodies to an elevated temperature and maintaining said first and second bodies at said elevated temperature during the application of said first and second voltage potentials.

30. A method according to claim 29 wherein the elevated temperature to which said first and second bodies are heated during said heating step is at least 350 degrees centrigrade.

31. A method according to claim 29 which includes the step of providing at least two conductive through holes in said second body each electrically connected, respectively, to said metallization and said first conductive body.

32. A method for manufacturing variable capacitance pressure sensing elements including the steps of:
providing a first body of conductive material having a first exterior surface with at least one recessed portion thereon substantially surrounded by a nonrecessed surface portion;
providing a second body of dielectric material having a second exterior surface with at least one area of said second surface having at least one electrically conductive metallization thereon;
bonding said dielectric material second surface to said conductive material first surface nonrecessed portion with a major portion of said recessed portion being positioned facing and in, adjacent, substantially parallel alignment with said electrically conductive metallization on said dielectric material second surface, said metallization and said major portion of said recessed portion of said first conductive body effectively forming a capacitor with said metallization forming one capacitor electrode and said major portion of said recessed portion of said first body forming another capacitor electrode thereof;
wherein said bonding step is performed by anodic bonding wherein a first voltage potential is applied to said first conductive body while a substantially different second voltage potential is applied to said to second dielectric body, and wherein a voltage potential substantially similar to said first voltage potential is applied to said metallization during the application of said first and second voltage potentials.

33. A method according to claim 32 which includes the step of providing an internal cavity for receiving a reference pressure, said cavity bounded by said recessed portion and said metallization, pressure changes acting on said major portion of said first body recessed portion causing it to flex and thereby change the capacitance of said capacitor by altering the spacing between said recessed portion and said metallization.

34. A method according to claim 33 which includes the step of sealing said internal cavity and providing therein a predetermined reference pressure.

* * * * *

UNITED STATES PATENT AND TRADEMARK OFFICE
CERTIFICATE OF CORRECTION

PATENT NO. : 4,384,899

DATED : May 24, 1983

INVENTOR(S) : Donald O. Myers

It is certified that error appears in the above—identified patent and that said Letters Patent is hereby corrected as shown below:

Claim 32, Column 14, line 49, delete "to".

Signed and Sealed this

Twenty-second Day of January 1985

[SEAL]

Attest:

DONALD J. QUIGG

Attesting Officer     Acting Commissioner of Patents and Trademarks